United States Patent
Shih (10) Patent No.: US 11,010,985 B2
(45) Date of Patent: May 18, 2021

(54) ELECTRONIC DEVICE AND METHOD FOR ADJUSTING SIZE OF THREE-DIMENSIONAL OBJECT IN AUGMENTED REALITY

(71) Applicant: Quanta Computer Inc., Taoyuan (TW)

(72) Inventor: Yu-Liang Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 46 days.

(21) Appl. No.: 16/550,730

(22) Filed: Aug. 26, 2019

(65) Prior Publication Data
US 2020/0286300 A1 Sep. 10, 2020

(30) Foreign Application Priority Data

Mar. 6, 2019 (TW) .................................. 108107338

(51) Int. Cl.
*G06T 19/20* (2011.01)
*G06T 19/00* (2011.01)
(Continued)

(52) U.S. Cl.
CPC .............. *G06T 19/20* (2013.01); *G06T 7/60* (2013.01); *G06T 7/70* (2017.01); *G06T 15/005* (2013.01);
(Continued)

(58) Field of Classification Search
CPC .......... G06T 7/70; G06T 19/20; G06T 7/246; G06T 7/33; G06T 7/73; G06T 7/74;
(Continued)

(56) References Cited

U.S. PATENT DOCUMENTS

| 2013/0215148 A1* | 8/2013 | Antonyuk | ............... G06F 3/017 345/633 |
| 2016/0012611 A1* | 1/2016 | Wexler | ..................... G06T 7/62 382/103 |

(Continued)

FOREIGN PATENT DOCUMENTS

| CN | 101702233 A | * | 5/2010 | ............... G06T 7/00 |
| CN | 101702233 A | | 5/2010 | |
| TW | 201724031 A | | 7/2017 | |

OTHER PUBLICATIONS

Chinese language office action dated Jan. 7, 2020, issued in application No. TW 108107338.

*Primary Examiner* — Mark K Zimmerman
*Assistant Examiner* — Jonathan M Cofino
(74) *Attorney, Agent, or Firm* — McClure, Qualey & Rodack, LLP (57) ABSTRACT

An electronic device is provided. The electronic device includes: an image sensor, a display device, and a processor. The image sensor captures a plurality of object images of a target object on which a first positioning tag, a second positioning tag, and a third positioning tag are disposed. The processor executes an augmented-reality program to perform the following steps: recognizing the first positioning tag, the second positioning tag, and the third positioning tag from each object image; calculating a scale ratio for each dimension of a three-dimensional model according to the positions of the first, second, and third positioning tags; performing an image-scaling process on the three-dimensional model and rendering the scaled three-dimensional model; and overlaying the scaled three-dimensional model on each object image to generate an output image and displaying the output image on the display device.

4 Claims, 5 Drawing Sheets

(51) Int. Cl.
  *G06T 15/00* (2011.01)
  *G06T 7/70* (2017.01)
  *G06T 7/60* (2017.01)
(52) U.S. Cl.
  CPC .... *G06T 19/006* (2013.01); *G06T 2219/2016* (2013.01)
(58) Field of Classification Search
  CPC .......... G06T 7/75; G06T 19/006; G06T 7/62; G06T 7/60; G06T 2219/2016
  See application file for complete search history.

(56) References Cited

U.S. PATENT DOCUMENTS

2019/0108683 A1* 4/2019 Valli ................ G06T 15/20
2019/0362559 A1* 11/2019 Dai .................. G06T 7/33
2019/0371071 A1* 12/2019 Lyons ............... G06T 7/62
                                                        382/103

* cited by examiner

ELECTRONIC DEVICE AND METHOD FOR ADJUSTING SIZE OF THREE-DIMENSIONAL OBJECT IN AUGMENTED REALITY

CROSS REFERENCE TO RELATED APPLICATIONS

This Application claims priority of Taiwan Patent Application No. 108107338, filed on Mar. 6, 2019, the entirety of which is incorporated by reference herein.

BACKGROUND OF THE DISCLOSURE

Field of the Disclosure

The disclosure relates to display apparatuses, and, in particular, to an electronic device and a method for adjusting the size of a three-dimensional object in augmented reality.

Description of the Related Art

With the advances being made in the relevant technologies, the application of augmented reality (AR) technology in wearable devices has become more and more mature. However, traditional AR techniques often have dimensional errors between the three-dimensional models in real space and those rendered in computer virtual space, or they cannot find a fast calculation method to map three-dimensional models to real-world sizes and proportions to overlap the three-dimensional model on real-world objects.

Therefore, there is a demand for an electronic device and a method for adjusting the size of a three-dimensional object in augmented reality to solve the aforementioned problem.

BRIEF SUMMARY OF THE DISCLOSURE

A detailed description is given in the following embodiments with reference to the accompanying drawings.

In an exemplary embodiment, an electronic device is provided. The electronic device includes: an image sensor, a display device, and a processor. The image sensor captures a plurality of object images of a target object on which a first positioning tag, a second positioning tag, and a third positioning tag are disposed. The processor executes an augmented-reality program to perform the following steps: recognizing the first positioning tag, the second positioning tag, and the third positioning tag from each object image; calculating a scale ratio for each dimension of a three-dimensional model according to the positions of the first, second, and third positioning tags; performing an image-scaling process on the three-dimensional model and rendering the scaled three-dimensional model; and overlaying the scaled three-dimensional model on each object image to generate an output image and displaying the output image on the display device.

In another exemplary embodiment, a method for adjusting a size of a three-dimensional object in augmented reality (AR) for use in an electronic device is provided. The electronic device includes an image sensor and a display device. The method includes the following steps: utilizing the image sensor to capture a plurality of object images of a target object, wherein a first positioning tag, a second positioning tag, and a third positioning tag are disposed on the target object; recognizing the first positioning tag, the second positioning tag, and the third positioning tag from each object image; calculating a scaling ratio in respect to each dimension of a three-dimensional object according to positions of the recognized first positioning tag, the recognized second positioning tag, and the recognized third positioning tag; performing an image-scaling process on the three-dimensional object according to the scaling ratio in respect to each dimension of the three-dimensional object and rendering the scaled three-dimensional object; and overlaying the scaled three-dimensional object on each object image to generate an output image and displaying the output image on the display device.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

Figure 1:
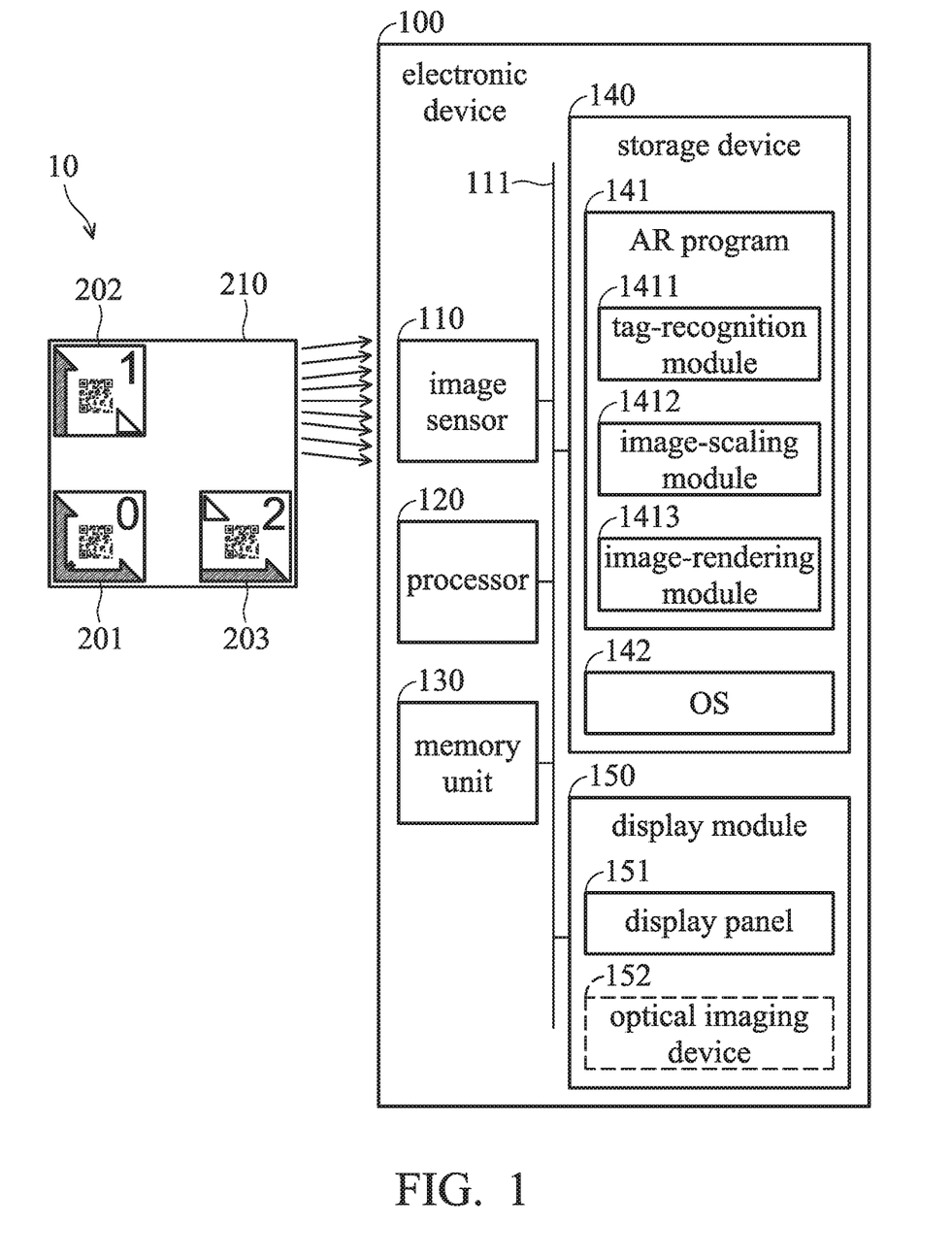
FIG. 1 is a block diagram of an augmented reality (AR) system in accordance with an embodiment of the disclosure.

FIG. 1 is a block diagram of an augmented reality (AR) system in accordance with an embodiment of the disclosure.

As shown in FIG. 1, the AR system 10 includes an electronic device 100 and 3 positioning tags 201~203. The electronic device 100, for example, may be a wearable electronic device such as a pair smart glasses, head-mounted display, etc., but the disclosure is not limited thereto.

The electronic device 100 includes an image sensor 110, a processor 120, a memory unit 130, a storage device 140, and a display module 150. The image sensor 110, processor 120, memory unit 130, storage device 140, and display module 150 couple to each other via the system bus 111. The image sensor 110 is configured to capture a scene image of a scene in which the positioning tags 201~203 are disposed (e.g., attached on the target object) to generate an image signal, wherein the image sensor 110 may be a complementary metal-oxide-semiconductor (CMOS) sensor or a charge-coupled device (CCD) sensor, but the disclosure is not limited thereto.

The processor 120 image-processing pipelines and/or video-processing pipelines that are configured to perform corresponding image processing and video processing on the image signal from the image sensor 110. In some embodiments, the processor 120 may be a central processing unit (CPU), a general-purpose processor, a system-on-chip (SoC), an application-specific integrated circuit (ASIC), a field-programmable gate array (FPGA), or an image-processing board (not shown), wherein various components are disposed on a printed circuit board (PCB) of the image-processing board to perform aforementioned image processing and video processing.

The memory unit 130 may be a volatile memory such as a static random access memory (SRAM) or a dynamic random access memory (DRAM), but the disclosure is not limited thereto. The storage device 140 may be a non-volatile memory such as a hard disk drive, a solid-state disk, a flash memory, or a read-only memory (ROM), but the disclosure is not limited thereto.

For example, the storage device 140 may store an augmented reality (AR) program 141 and an operating system 142 (e.g., an ANDROID or iOS operating system). The AR program 141 is configured to insert a three-dimensional model into the object image captured by the image sensor 110 to output an output image, wherein the AR program 141, for example, may be an AR engine, and the details will be described later. The processor 120 may load the operating system 142 and the AR program 141 from the storage device to the memory unit 130 for execution.

The display module 150 may be a display device capable of imaging on one or both eyes of the user. For example, if the electronic device 100 is a head-mounted display, the display module 150 may include a display panel 151 and left-eye/right-eye lenses (not shown) capable of imaging on the left-eye and right-eye of the user. The display panel 151, for example, may be a liquid-crystal display panel, a light-emitting diode (LED) panel, or an organic light-emitting diode (OLED) panel, but the disclosure is not limited thereto.

If the electronic device 100 is a pair of smart glasses, the display module 150, for example, may be an optical imaging device 152 which includes a micro-projector and a prism (not shown), and the output image (e.g., an image of the three-dimensional object) projected by the micro-projector can be reflected by the prism so that the light of the output image can be imaged on the retina of the user's one or both eyes.

The positioning tags 201~203, for example, can be disposed on a target object 210 for positioning and determining the scaling ratio of the three-dimensional model generated by the AR program 141. The positioning tags 201~203 can be implemented by a sticker or printed pattern having a special pattern, but the disclosure is not limited thereto. It should be noted that the patterns of the positioning tags 201~203 in FIG. 1 are for purposes of description, and the disclosure is not limited to the patterns of the positioning tags in FIG. 1.

For example, the positioning tag 201 can be regarded as a origin positioning tag, and the AR program 141 can refer to the position of the positioning tag 201 (e.g., the origin coordinate) when rendering the three-dimensional object, and align a fixed point of the three-dimensional object with the positioning tag 201. The positioning tag 202, for example, can be regarded as a vertical-scaling-ratio-calculation tag, and the AR program 141 can determine the vertical scaling ratio of the three-dimensional object based on the distance between the positioning tags 201 and 202. The positioning tag 203, for example, can be regarded as a horizontal-scaling-ratio-calculation tag, and the AR program 141 can determine the horizontal scaling ratio of the three-dimensional object based on the distance between the positioning tags 201 and 203.

As illustrated in FIG. 1, the AR program 141 includes a tag-recognition module 1411, an image-scaling module 1412, and an image-rendering module 1413. When the processor 120 receives the image signal from the image sensor 110, the tag-recognition module 1411 of the AR program 141 may recognize the positioning tags 201~203 from the object image in the image signal. In some embodiments, the tag-recognition module 1411 may recognize three or more positioning tags from the object image using well-known recognition techniques. In some embodiments, the tag-recognition module 1411 may sequentially recognize each of the positioning tags 201~203 in the object image in a predetermined time period.

Figure 3:
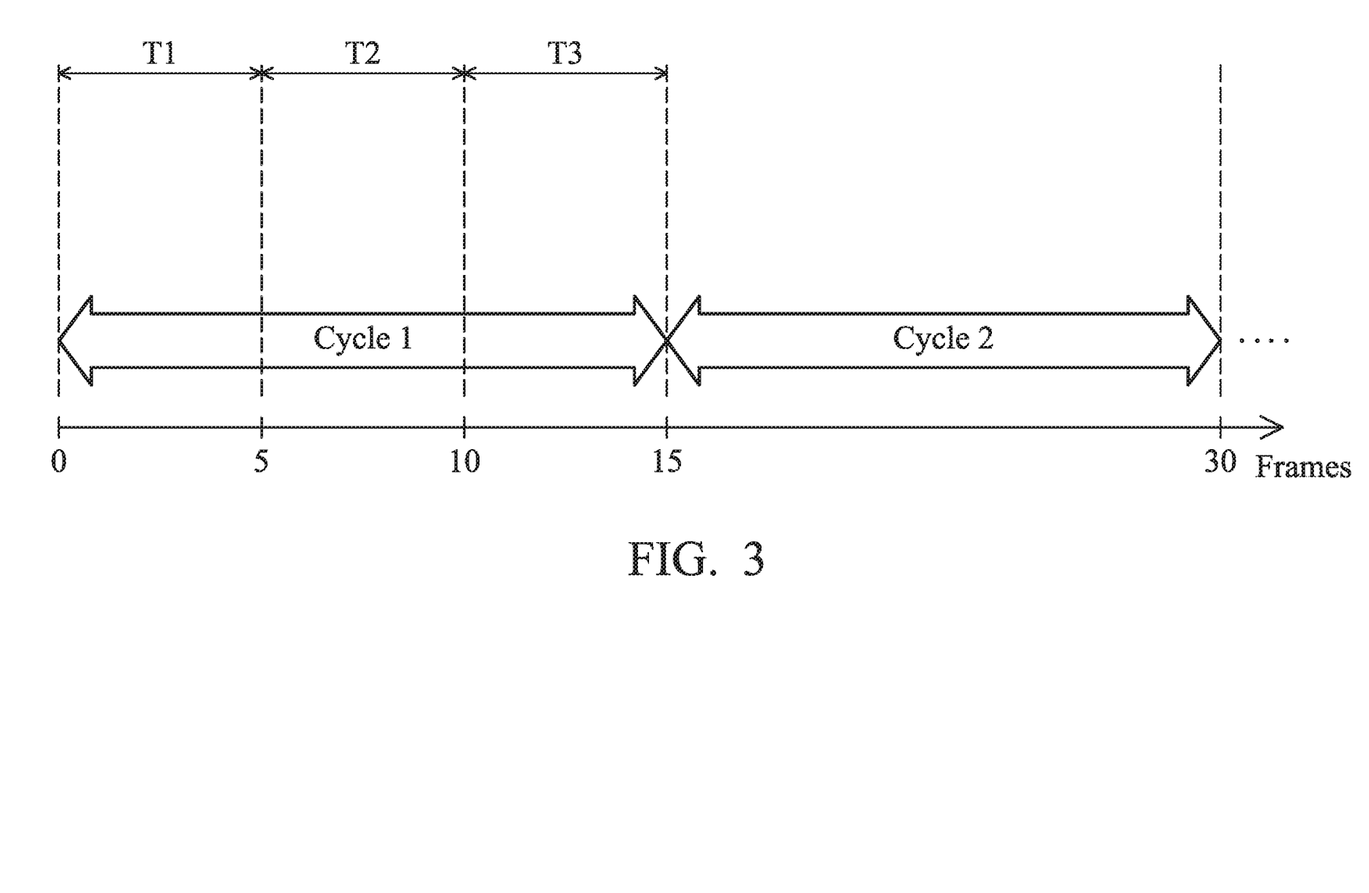
FIG. 3 is a diagram of different image layers in accordance with an embodiment of the disclosure.

For example, as illustrated in FIG. 3, if the image sensor 110 captures object images with a speed of 30 frames per second, the tag-recognition module 1411 may recognize the positioning tag 201 and its three-dimensional coordinates from the object image within the time period T1 from frames 1 to 5 in the first cycle (i.e., 30 frames). The tag-recognition module 1411 may recognize the positioning tag 202 and its three-dimensional coordinates from the object image within the second time period T2 from frames 6 to 10 in the first cycle. The tag-recognition module 1411 may recognize the positioning tag 203 and its three-dimensional coordinates from the object image within the second time period T3 from frames 11 to 15 in the first cycle. It should be noted that the required time for recognizing a positioning tag is not limited to the time of 5 frames (i.e., $5/30=1/6$ second), depending on the performance of the processor 120 and the object-recognition algorithm used.

In response to the positioning tags 201~203 being recognized by the tag-recognition module 1411, the image-scaling module 1412 may calculate the vertical scaling ratio and the horizontal scaling ratio of the three-dimensional object in the object image according to the three-dimensional coordinates of the positioning tags 201~203, and select the smaller of the vertical scaling ratio and the horizontal scaling ratio to use as the depth-scaling ratio. Then, the image-scaling module 1412 may performing image scaling on corresponding dimensions of the three-dimensional objects according to the calculated vertical scaling ratio, horizontal scaling ratio, and depth-scaling ratio.

The image-rendering module 1413 is configured to insert the image-scaled three-dimensional object generated by the image-scaling module 1412 into the object image to generate an output image. For example, the reference point for inserting the three-dimensional object into the object image is the three-dimensional coordinates of the positioning tag 201. It should be noted that the object image, for example, can be regarded as a basic image layer (i.e., a bottom image layer), and the positioning tags 201~203 can be regarded as the intermediate image layer, and the three-dimensional object can be regarded as the topmost image layer which covers on the object image. In addition, the image-rendering module 1413 can control the transparency of each image layer, and perform image-overlaying of each image layer.

Figure 2A:
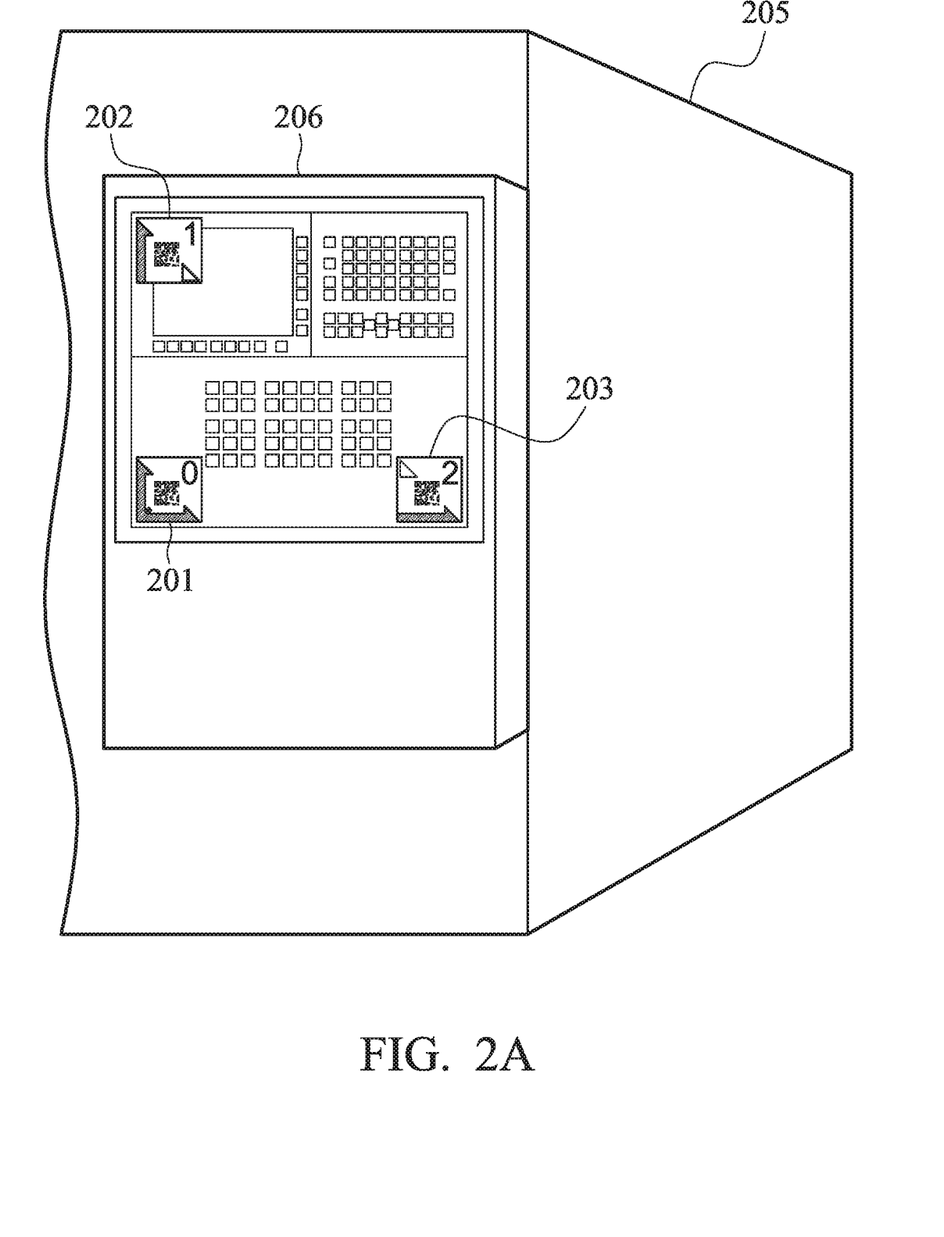
FIG. 2A is a diagram of positioning tags disposed on a target object in accordance with an embodiment of the disclosure.

FIG. 2A is a diagram of positioning tags disposed on a target object in accordance with an embodiment of the disclosure. For example, the machine 205, for example, may be a computer-numerical-control (CNC) machine that includes a control panel 206. The control panel 206 includes a plurality of physical buttons and a display screen. For example, the shape of the control panel 206 may be a rectangle. The positioning tag 201 can be disposed on the bottom-left corner of the control panel 206 for use as a reference positioning point. The positioning tags 202 and 203, for example, can be disposed on the upper-left corner and bottom-right corner of the control panel 206 for determining the vertical scaling ratio and vertical scaling ratio of the control panel 206.

When the user is to utilize the AR program 141 to replace the control panel 206 (e.g., a target object) of the machine 205 with an AR-simulated panel (e.g., a three-dimensional object), the positioning tags 201~203 may be disposed on the bottom-left corner, upper-left corner, and bottom-right corner of the control panel 206 in advance, respectively.

Figure 2B:
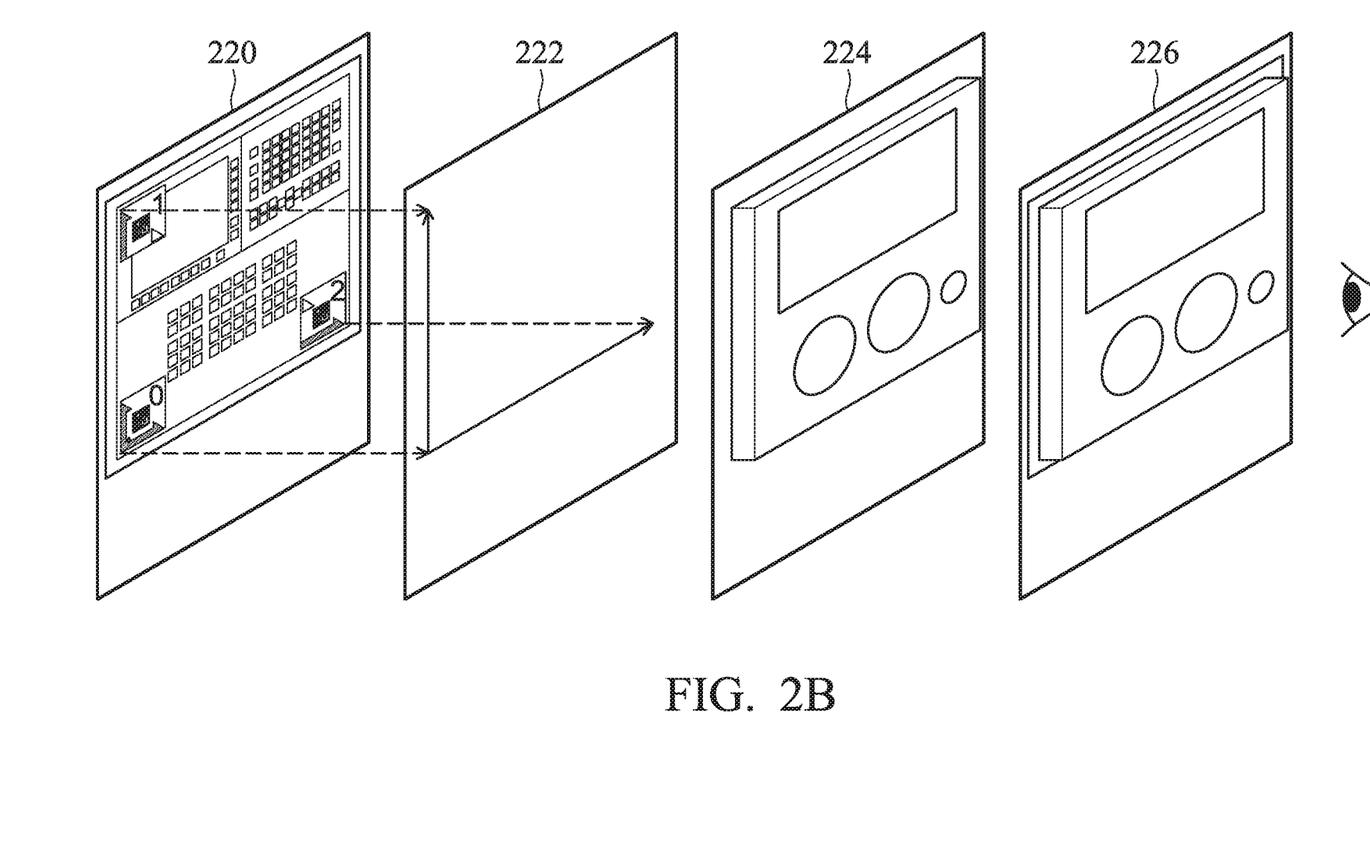
FIG. 2B is a diagram of an object image of the target object in accordance with the embodiment of FIG. 2A.

FIG. 2B is a diagram of an object image of the target object in accordance with the embodiment of FIG. 2A.

After the electronic device 100 is booted up, the image sensor 110 may capture object images of the control panel 206 of the machine 205 to generate an image signal, wherein each object image includes the positioning tags 201~203. In addition, the object image can be regarded as a basic input image layer or a video-streaming image layer 220 that is used as the bottom image layer.

Afterwards, the AR program 141, for example, may recognize the positioning tags 201~203 from the object images, where the positioning tags 201~203 can be regarded as intermediate-tag-image layer 222. For example, the AR program 141 may recognize the positioning tag 201 from the object image, and determine the three-dimensional coordinates of the positioning tag 201, and define the three-dimensional coordinates as the origin coordinates of the three-dimensional object.

In addition, the AR program 141 may also recognize the positioning tags 202 and 203 from the object image, and determine the three-dimensional coordinates of the positioning tags 202 and 203. Accordingly, the AR program may calculate the vertical pixel distance distanceU (e.g., Euclidean distance) between the positioning tags 201 and 202, and the horizontal pixel distance distanceV (e.g., Euclidean distance) between the positioning tags 201 and 203. Then, the AR program 141 may calculate the vertical scaling ratio scaleU and the horizontal scaling ratio scaleV of the three-dimensional object to be inserted into the object image.

Specifically, the three-dimensional object generated by the AR program 141 may have a predetermined height Y, width X, and depth D (e.g., can be expressed by corresponding numbers of pixels). If the three-dimensional object without scaling is directly added into the object, the three-dimensional object in the output image may be oversized or undersized that is beyond expectations. Accordingly, the three-dimensional coordinates of the positioning tags can be used to calculate the vertical pixel distance between the positioning tags 201 and 202, and the horizontal pixel distance between the positioning tags 201 and 203. Thus, the vertical scaling ratio scaleU and the horizontal scaling ratio scaleV can be calculated respectively using equations (1) and (2):

$$scaleU = distanceU/Y \qquad (1)$$

$$scaleV = distanceV/X \qquad (2)$$

However, in practical conditions, the vertical scaling ratio scaleU is not necessarily equal to the horizontal scaling ratio scaleV, and the depth of the three-dimensional object does not have a corresponding positioning tag. Accordingly, the AR program 141 may compare the vertical scaling ratio scaleU with the horizontal scaling ratio scaleV, and select the smaller of the vertical scaling ratio scaleU and the horizontal scaling ratio scaleV for use as the depth scaling ratio scaleW of the three-dimensional object. Thus, the depth scaling ratio scaleW can be expressed by the following program code:

```
If (scaleU > scale V) {
    scaleW= scaleV;
} else {
    scaleW = scaleU;
}
```

The AR program 141 can position the three-dimensional object on the three-dimensional coordinates of the positioning tag 201, and perform scaling to the corresponding dimensions (e.g., height Y, width X, and depth W) of the three-dimensional object according to the calculated vertical scaling ratio scale U, horizontal scaling ratio scale V, and depth scaling ratio scale W.

It should be noted that, since the image sensor 110 may repeatedly capture object images, the AR program 141 may also perform calculation on the input object image in real time. If the user is wearing the electronic device 100 and moving forward or backward, the size of the three-dimensional object in the output image viewed by the user may also be scaled in accordance with the changes of the pixel distance between the positioning tags 201 and 202 and the pixel distance between the positioning tags 201 and 203. That is, the size of the three-dimensional object can be adjusted in accordance with the size of the area (e.g., a rectangle) allocated by the positioning tags 201~203. The three-dimensional object, for example, can be regarded as a three-dimensional-object image layer 224, and the output image 226 viewed by the user may be an image having the three-dimensional-object image layer 224 as the topmost layer that covers on the intermediate-tag image layer 222 and the basic input image layer 220.

Accordingly, in the embodiment, the AR program 141 may replace the control panel 206 of the machine 205 with the AR-simulated panel (i.e., the three-dimensional object), such as overlaying the simulated three-dimensional object with the real scene, and the size of the three-dimensional model can be adjusted as the user moves, so that the user may experience a more realistic AR effect.

Figure 4:
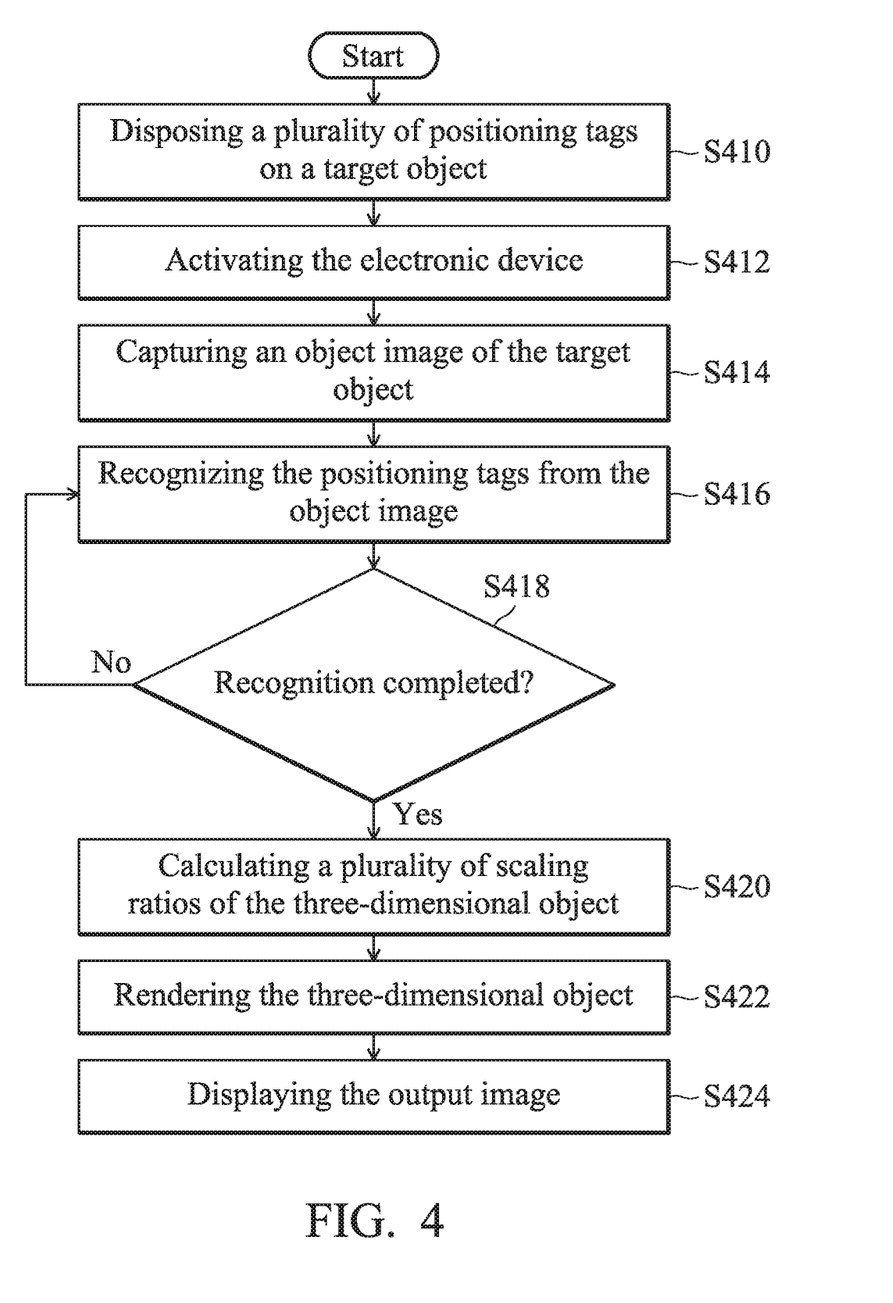
FIG. 4 is a flow chart of a method for adjusting the size of the three-dimensional object in augmented reality in accordance with an embodiment of the disclosure.

FIG. 4 is a flow chart of a method for adjusting the size of the three-dimensional object in augmented reality in accordance with an embodiment of the disclosure.

Referring to FIG. 1 and FIG. 4, in step S410, a plurality of positioning tags are disposed on a target object. The positioning tags, for example, may include positioning tags 201~203, wherein the positioning tag 201 can be referred to as an origin positioning tag, and the positioning tag 202 can be referred to as a vertical-scaling-ratio-calculation tag, and the positioning tag 203 can be referred to as a horizontal-scaling-ratio-calculation tag.

In step S412, the electronic device 100 is activated. In response to the positioning tags 201~203 being disposed on the target object, the electronic device 100 can be activated to execute the AR program 141.

In step S414, an object image of the target object is captured by the image sensor 110. For example, the image sensor 110 may repeatedly capture object images of the target object to generate an image signal, and each object image includes the positioning tags 201~203 for positioning the three-dimensional object and determining the size of the three-dimensional object.

In step S416, the positioning tags are recognized from the object image. For example, the tag-recognition module 1411 of the AR program 141 may recognize the positioning tags 201~203 from the object image in the image signal. In some embodiments, the tag-recognition module 1411 may simultaneously recognize three or more positioning tags from the object image. In some other embodiments, the tag-recognition module 1411 may sequentially recognize each of the positioning tags 201~203 within a predetermined time period.

In step S418, it is determined whether the recognition of the positioning tags has completed. For example, if the tag-recognition module 1411 is capable of simultaneously recognizing three or more positioning tags from the object image, it can be determined that the recognition of the positioning tags has completed when performing step S418. If the tag-recognition module 1411 has to recognize one of the positioning tags each time, it can be determined that the recognition of the positioning tags has not completed yet when three different positioning tags 201~203 have not been recognized yet, and the flow returns to step S416.

In step S420, a plurality of scaling ratios of the three-dimensional object are calculated. For example, in response to recognition of the positioning tags 201~203 being completed by the tag-recognition module 1411, the image-scaling module 1412 may calculate the vertical scaling ratio and horizontal scaling ratio of the three-dimensional object to be added into the object image according to the three-dimensional coordinates of the positioning tags 201~203, and select the smaller of the vertical scaling ratio and the horizontal scaling ratio and using this as the depth scaling ratio.

In step S422, a three-dimensional object is rendered. For example, the image-scaling module 1412 may perform scaling on the corresponding dimensions of the three-dimensional object according to the calculated vertical scaling ratio, horizontal scaling ratio, and depth scaling ratio, and the details can be referred to in the embodiments of FIGS. 2A and 2B. For example, the positioning point (e.g., the origin coordinates) of the three-dimensional object can be the three-dimensional coordinates of the positioning tag 201.

In step S424, the output image is displayed. For example, as depicted in FIG. 2B, the three-dimensional object can be referred to as a three-dimensional-object image layer 224, and the output image 226 viewed by the user may be an image having the three-dimensional-object image layer 224 as the topmost layer that covers on the intermediate-tag image layer 222 and the basic input image layer 220. In some embodiments, if the electronic device 100 is a pair of smart glasses, the display module 150, for example, may be an optical imaging device 152 which includes a micro-projector and a prism (not shown), and the output image (e.g., an image of the three-dimensional object) projected by the micro-projector can be reflected by the prism so that the light of the output image can be imaged on the retina of the user's one or both eyes. In some other embodiments, if the electronic device 100 is a head-mounted display, the display module 150 may include a display panel 151 and left-eye/right-eye lenses (not shown) capable of imaging on the left-eye and right-eye of the user.

In view of the above, an electronic device and a method for adjusting the size of the three-dimensional object are provided in the present disclosure. The electronic device and the method are capable of recognizing three positioning tags, that are disposed on the target object in advance, from the object image captured by the image sensor, thereby determining the position and scaling ratio of the three-dimensional object in the scene. Since the since the image sensor 110 may repeatedly capture object images, the AR program 141 performed by the electronic device 100 may also perform calculation on the input object image in real time. If the user is wearing the electronic device 100 and moving forward or backward, the size of the three-dimensional object in the output image viewed by the user may also be scaled in accordance with the changes of the pixel distance between the positioning tags 201 and 202 and the pixel distance between the positioning tags 201 and 203. Accordingly, the three-dimensional object rendered in the object image may fit the scale of the target object, thereby achieving a better user's experience in augmented reality.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electronic device, comprising:
   an image sensor, configured to capture a plurality of object images of a target object, wherein a first positioning tag, a second positioning tag, and a third positioning tag are disposed on the target object;
   a display device;
   a processor, configured to perform an augmented-reality program to perform steps of:
   recognizing the first positioning tag, the second positioning tag, and the third positioning tag from each object image;
   calculating a scaling ratio corresponding to each dimension of a three-dimensional object according to positions of the recognized first positioning tag, the recognized second positioning tag, and the recognized third positioning tag;
   performing an image-scaling process on the three-dimensional object according to the scaling ratio corresponding to each dimension of the three-dimensional object and rendering the scaled three-dimensional object; and
   overlaying the scaled three-dimensional object on each object image to generate an output image and displaying the output image on the display device,
   wherein first three-dimensional coordinates of the first positioning tag are origin coordinates of the scaled three-dimensional object,
   wherein the AR program executed by the processor further performs the following steps:
   calculating a vertical distance according to the first three-dimensional coordinates of the first positioning tag and second three-dimensional coordinates of the second positioning tag;
   calculating a horizontal distance according to the first three-dimensional coordinates of the first positioning tag and third three-dimensional coordinates of the third positioning tag;
   dividing height and width of the three-dimensional object with the vertical distance and the horizontal distance to obtain a vertical scaling ratio and a horizontal scaling ratio, respectively,
   setting the smaller of the vertical scaling ratio and the horizontal scaling ratio as a depth scaling ratio; and performing the image-scaling process on length, width, and depth of the three-dimensional object to render the scaled three-dimensional object.

2. The electronic device as claimed in claim 1, wherein the processor sequentially recognizes the first positioning tag, the second positioning tag, and the third positioning tag in a first time period, a second time period, and a third time period, respectively,
wherein the third time period is later than the second time period, and the second time period is later than the first time period.

3. A method for adjusting size of a three-dimensional object in augmented reality (AR), for use in an electronic device, wherein the electronic device comprises an image sensor and a display device, the method comprising:
utilizing the image sensor to capture a plurality of object images of a target object, wherein a first positioning tag, a second positioning tag, and a third positioning tag are disposed on the target object;
recognizing the first positioning tag, the second positioning tag, and the third positioning tag from each object image;
calculating a scaling ratio corresponding to each dimension of a three-dimensional object according to positions of the recognized first positioning tag, the recognized second positioning tag, and the recognized third positioning tag;
performing an image-scaling process on the three-dimensional object according to the scaling ratio in respect to each dimension of the three-dimensional object and rendering the scaled three-dimensional object; and
overlaying the scaled three-dimensional object on each object image to generate an output image and displaying the output image on the display device,
wherein first three-dimensional coordinates of the first positioning tag are origin coordinates of the scaled three-dimensional object,
wherein the step of performing an image-scaling process on the three-dimensional object according to the scaling ratio in respect to each dimension of the three-dimensional object and rendering the scaled three-dimensional object comprises:
calculating a vertical distance according to the first three-dimensional coordinates of the first positioning tag and second three-dimensional coordinates of the second positioning tag;
calculating a horizontal distance according to the first three-dimensional coordinates of the first positioning tag and third three-dimensional coordinates of the third positioning tag;
dividing height and width of the three-dimensional object with the vertical distance and the horizontal distance to obtain a vertical scaling ratio and a horizontal scaling ratio, respectively;
setting the smaller of the vertical scaling ratio and the horizontal scaling ratio as a depth scaling ratio; and
performing the image-scaling process on the length, width, and depth of the three-dimensional object to render the scaled three-dimensional object.

4. The method as claimed in claim 3, further comprising:
sequentially recognizing the first positioning tag, the second positioning tag, and the third positioning tag in a first time period, a second time period, and a third time period, respectively,
wherein the third time period is later than the second time period, and the second time period is later than the first time period.

* * * * *